Jan. 12, 1971  E. L. BOWLING  3,555,370
ELECTROLYTIC CAPACITORS HAVING IMPROVED SEAL AND VENT
Filed March 17, 1969

INVENTOR.
EDWARD L. BOWLING
BY
ATTORNEY

United States Patent Office 3,555,370
Patented Jan. 12, 1971

3,555,370
ELECTROLYTIC CAPACITORS HAVING
IMPROVED SEAL AND VENT
Edward L. Bowling, Broadway, N.C., assignor to Cornell-Dubilier Electric Corporation, Newark, N.J., a corporation of Delaware
Filed Mar. 17, 1969, Ser. No. 807,605
Int. Cl. H01g 9/10
U.S. Cl. 317—230         9 Claims

ABSTRACT OF THE DISCLOSURE

A capacitor including a container and a capacitor section enclosed in the container is provided with pressure relief plugs around the terminals of the capacitor where those terminals extend through a wall of the container.

This invention relates to electrolytic capacitors and more particularly to seal and vent structures for such capacitors.

One widely used type of electrolytic capacitors is in the form of a wound capacitor section which is impregnated with an electrolyte and a gas impervious container in which the wound esection is mounted. It is an unfortunate property of such capacitors that in one failure mode a considerable volume of gas is generated. Electrolytic capacitors usually employ liquid and airtight seals in order to prevent loss of the electrolyte and to prevent contamination of the electrolyte. When the sealed capacitors fail, high gas pressures are generated in the sealed container. Such high pressures in the past led to extensive damage upon the catastrophic failure by expulsion of the seal or by rupture of the container. Many solutions have been proposed for avoiding damage including the provision of various types of relief valves em-employing fracturing diaphragms to limit the container pressure to a pressure below that which would cause rupture of the container. Other solutions have included controlled rupture of the container by the provision of thin portions of the container so as to avoid having portions of the capacitor ejected at high speed.

In prior attempts at venting and/or sealing electrolytic capacitors problems have arisen in that some rise in internal pressure is normal and acceptable during transient conditions which might otherwise cause unnecessary venting of the unit. Once the capacitor has been vented loss of electrolyte will occur and either cause additional damage or shorten the capacitor's useful life.

It is an object of this invention to provide an improved electrolytic capacitor seal construction which provides greater control over the venting characteristic of electrolytic capacitors during times of gas pressure generation. It is another object of this invention to give controlled directional discharge of the gas products and/or electrolytes during gas generation failure of the capacitor. It is still another object of this invention to provide an improved capacitor terminal seal and vent combined structure which gives improved retention of gas pressure. It is further an object of this invention to simplify and reduce the number of parts required in the production of vented electrolytic capacitors. Yet another object of this invention is to provide a vented capacitor that has controlled ejection of the seal structure.

The above and other objects and advantages of the invention are accomplished in one embodiment of the invention which comprises an electrolytic capacitor that includes a gas impervious container adapted to enclose a wound capacitor unit which is impregnated with an electrolyte. One wall of the container has an inwardly extended opening therein whose edge is formed to provide a conical portion and a contiguous cylindrical portion. A conductive member connected to one of the capacitor electrodes extends through the opening in the wall. A cylindrical resilient plug of insulating material is force fit into the opening surrounding and insulating the conductive member. The plug seals the opening and the conductive member in cooperation with the adjacent edges of the opening. The plug is compressed to a 10–40% reduction in volume at least in the cylindrical portion of the opening and is ejectable from the opening to thereby vent the container. Venting occurs at pressures below the level which would cause rupture of the container or forceful ejection of other portions of the capacitor. The plug surrounds the conductive member that is connected to the accompanying circuitry so that when it is expelled it is retained adjacent the capacitor.

Many problems have been encountered in the economical production of sealed multiple section electrolytic capacitors. Such capacitors have plural windings in a common container with separate leads brought out through the container wall for each. Well-known techniques such as crimping or spinning in of the container edge to seal the capacitor are not applicable to multi-terminal capacitors. Another object of the invention is to provide a novel multiple terminal structure for use in sealed electrolytic capacitors.

The above and other novel features and advantages of the invention will become apparent from consideration of the following disclosure when taken in conjunction with the accompanying drawings. In those drawings.

Figure 1:
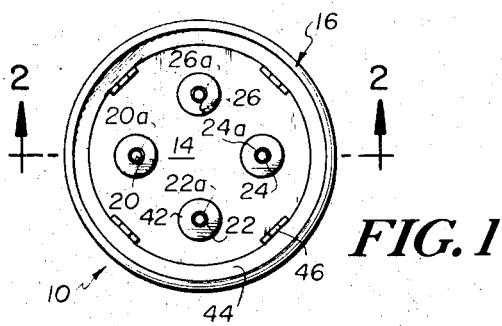
FIG. 1 is a plan view of one embodiment of the invention.
Figure 2:
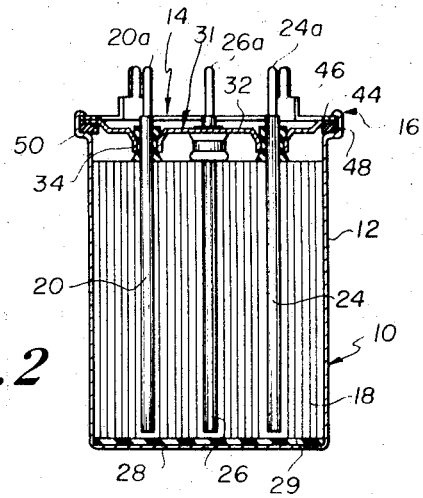
FIG. 2 is an elevation view in section taken along the line 2—2 of FIG. 1.
Figure 3:
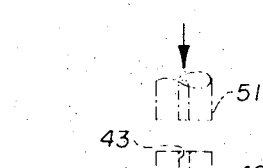
FIG. 3 is a fragmentary elevational view on a greatly enlarged scale of the embodiment of the invention of FIG. 2.

Referring to FIGS. 1–3 the capacitor 10 includes the gas impervious container 12 and a complete header assembly 14 which is hermetically sealed at 16 to the container 12 by wellknown techniques. An electrolytic capacitor body 18 is positioned within the container 12. The body comprises a multi-section unit having terminals 20, 22, 24, 26 connected to sections of different capacitance rating. In the illustrative embodiment one of the terminals, i.e., terminal 26, is common to all of the sections and terminals 20–24 are rod-type anode risers connected to the capacitor electrodes. Each section includes convolutely wound assembly of film forming metal and electrolyte-impregnated porous spaces. The wound sections may be insulated from the closed end wall 28 of the container 12 by margined portions of the spacers or by a layer of insulation 29.

In the presently preferred embodiment the header assembly 14 which closes the open end of the container 12 includes a header member 31 of aluminum. The header member 31 has a substantially planar base 32 and an upright side wall 33 which terminates in a planar ring 33a. A plurality of extruded portions 34 are formed in the base 32. Each of the extrusions 34 has a center opening 35 that progressively decreases from the exterior and is defined by conical edge 36 and cylindrical edge 38 which terminates abruptly at the punched edge 40. A cylindrical plug 42 of resilient insulating material, which is longer than the depth of the opening, is force-fit into the opening 35 around each of the terminals 20–26 as will be explained in detail below. Each plug insulates a respective one of the terminals 20–26 from the header member 31 and, at the same time, seals the terminal to the header.

The embodiment of the invention shown in FIGS. 1–3 is specifically designed for application to a printed circuit board and therefore each of the terminal members 20–26 is provided with a butt welded lead wire *a*. The lead wires 20*a*–26*a*, are soldered to respective portions of the end-use apparatus. Capacitor 10 is mounted on the printed circuit board, not shown, by mounting ring 44 which is secured to the container 12 by the seal structure 16. Mounting ring 44 has a plurality of mounting lugs 46 which are mechanically secured to the printed circuit board.

Referring to FIG. 3 each resilient cylindrical plug 42 is provided with a central bore 43 that closely fits the terminals 20–26. Suitable plugs have been fabricated from ethylene propylene having a durometer hardness of 60–80. The plug must be compatible with the electrolyte. The header and winding may be assembled in a fixture remote from the container 12 or the assembly may be made in the container. In either event the header and the section are restrained against relative movement. The terminal members 20–26 of the wound section are first positioned in the respective openings 34. A plug 42 is positioned on each of the terminal members and is then slid along the respective terminal 26, as by a ram 51, and driven into engagement with the conical edge 36 of the opening 35. The cone shape of the opening compresses the leading end of the plug and guides it into position. Continued application of the end-on inserting force drives the plug into the final position of FIG. 3 wherein the leading end of the plug escapes from its compressed form and a bulbous protrusion 52 is formed as the compressed end expands back to its original size. Thus the plug has a compressed area in the cylindrical portion 38 of the opening between the extrusion wall and the riser 26 wherein the volume of the plug is reduced between 10–40% while at the ends the plug is uncompressed and is relatively stress free. Each of the plugs may be inserted separately or all may be inserted simultaneously. In either event a simplified header construction for multi-terminal capacitors is provided.

The hermetic edge seal 16 includes a ring gasket 48 seated against shoulder 50 in the side wall of the container 12. The header member 31 is positioned above the gasket 48 with the portion 33*a* in engagement therewith. The mounting ring 44 is next positioned on the header member and the side wall of the container 12 is then rolled in by well-known forming techniques to compress the gasket and securely lock the parts together. The capacitor body 18 may be retained in position without the use of potting compound since it is trapped between the inner face of the plugs and the end wall 28 of the container.

When excess gas pressure is generated within the container the capacitor 10 is vented by the expulsion of one of the plugs 42. The amount of pressure that must be built up is controlled by the friction between the plugs, terminal, and header and the engagement of the resilient plug and the edge 40 of the extrusion. Once sufficient pressure is developed the force on the inside end of plug 42 drives it back through the opening along the terminal member and onto the lead wire that is connected to the embodying equipment. This is a rather forceful movement and but for the fact that the plug is captive on the terminal member and lead wire it would be hazardous. By virtue of the entrapment of the plug additional damage and hazard is avoided.

In capacitors fabricated according to the invention the header is of .030 inch thick aluminum and each of the extrusions 35 has a conical section .079 inch long that tapers inwardly from diameter of .250 inch to .165 inch at the start of the cylindrical section. The cylindrical section is .047 inch long. The seal/vent plug, of ethylene propylene, is .200 inch long and has an outer diameter of .215 inch. The plugs have a durometer hardness of 70 and are, preferentially, compressed 30% to 40% in the area between the terminals 20–26 and the extrusion walls. Artificially induced failures of capacitors of this construction have resulted in safe venting without rupture of the container with the vented plugs retained on the associated lead wires as described above.

Figure 4:
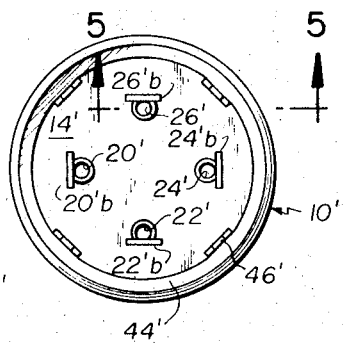
FIG. 4 is a plan view of another embodiment of the invention.
Figure 5:
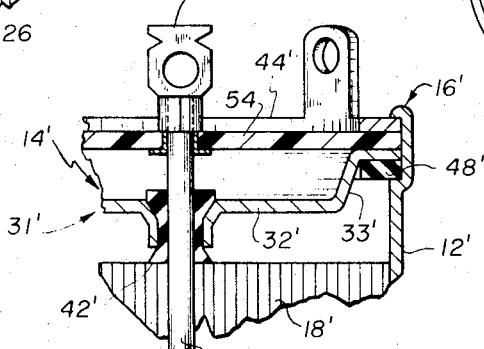
FIG. 5 is a fragmentary elevational view of the embodiment of FIG. 4 viewed along the line 5—5 of FIG. 4, on an enlarged scale.

Referring to FIGS. 4 and 5 another embodiment of the invention is illustrated which is particularly adapted for use with conventionally wired circuits and which has certain other novel features. Parts similar to those of FIGS. 1–3 bear the same reference numerals primed. Capacitor 10′ is equipped with standard wiring terminals *b*, affixed to an insulating member 54. Each of the secondary terminals is connected to a respective one of the capacitor terminals 20′–26′. The terminal mounting board 54 is secured to the container 12′ by the seal 16′. Header member 31′ is formed with a relatively deep wall 33′ so as to provide clearance for the seal plug 42′ between the header base 32′ and the underside of the insulator 54. In this construction a plug 42′ of the capacitor, when expelled due to dangerous gas pressure within the container, is trapped between the disc 54 and header 44′.

Figure 7:
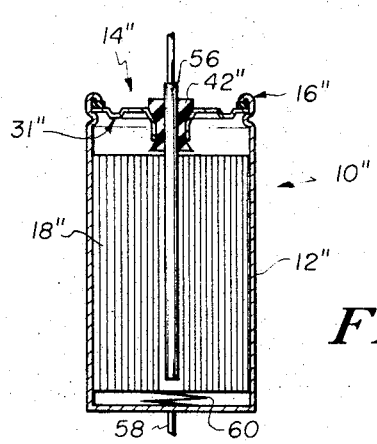
FIG. 7 is a sectional view of the capacitor in FIG. 5 viewed along the line 7—7 of FIG. 6.
Figure 6:
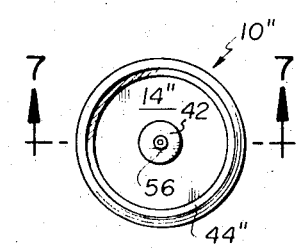
FIG. 6 is a plan view of a third embodiment of the invention on a greatly enlarged scale.

Still another embodiment of the invention is shown in FIGS. 6 and 7 as applied to a miniature axial-lead single-section capacitor. Parts similar to those of FIGS. 1–3 bear the same reference numerals double primed. In this embodiment the connections to the section 18″ are made through appropriate leads 56 and 58 connected to the winding and to the case respectively. The operative electrode is connected directly to riser 56 and through a folded tab 60 to the container 12″ and thence to the axial lead 58. The header 44″ includes the plug type seal construction of the embodiments previously described and functions in a similar manner, the header member 31″ being sealed at 16″ to the container 12″. In this embodiment the expelled plug 42″ is captive on a lead wire 56 as in the embodiment of FIGS. 1–3.

In all of the embodiments described above a sealed and vented structure has been provided without additional parts for each important function. Furthermore, importantly, the vent/seal structures in each case are substantially below the plane of the header resulting in a compact and rugged capacitor. The terminal seal locations may be selected without the necessity of providing a specific location for the vent structure resulting in a device having a compact and rugged design.

While several embodiments of the invention have been shown and described in detail, it will be apparent to thore skilled in the art that various changes and modifications may be made herein without departing from the spirit and scope of the invention.

What I claim is:

1. An electrolytic capacitor including a gas impervious container and a capacitor section, said section being enclosed within said container and having a terminal extending therefrom for connection external to said container, said capacitor section containing an electrolyte and sealing means including a wall of said container having an extruded opening therein, the edge of said opening having a conical portion and a contiguous cylindrical portion, said terminal extending through said opening, a cylindrical semi-rigid plug having a force fit with said cylindrical portion of said opening and said terminal disposed in and sealing said opening, said plug being compressed to a 10–40% reduction in volume at least in said cylindrical portion of said opening about said terminal, said plug being locked under compression in said opening, said plug being ejectable from said opening for venting said container in response to abnormal pressures occurring within said container, said venting occurring at pressures below the level of rupture of said container.

2. A capacitor according to claim 1 wherein said wall has a plurality of said extruded openings therein, and wherein said capacitor unit comprises multiple terminals, each terminal projecting through a respective one of said openings, each of said plugs being associated with a respective one of said terminal members, and one of said plugs sealing each of said openings.

3. A capacitor according to claim 1 wherein said plug is a good electrical insulator having a durometer hardness of 60-70.

4. A capacitor according to claim 3 wherein said plug is ethylene propylene.

5. An electrolytic capacitor according to claim 1 including a secondary terminal, means mounting said secondary terminal on said container, and spaced from said wall, said plug being trapped between said container and said secondary terminal mounting means when expelled.

6. An electrolytic capacitor according to claim 1 wherein said terminal member is an anode riser.

7. A capacitor according to claim 1 wherein said extruded openings extend inwardly and wherein said sealing means lies substantially below the plane of said wall.

8. A capacitor according to claim 2 wherein said extruded openings extend inwardly and wherein said sealing means lies substantially below the plane of said wall.

9. An electrolytic capacitor according to claim 1 further including means disposed externally of said wall and opposite to said plug for obstructing the motion of said plug upon its being ejected from said opening.

References Cited

UNITED STATES PATENTS

| 1,871,012 | 8/1932 | Scofield | 317—230 |
| 1,954,636 | 4/1934 | Lilienfeld | 317—230 |
| 2,213,209 | 9/1940 | DeLange et al. | 317—230 |
| 2,266,523 | 12/1941 | Waterman | 317—230 |

JAMES D. KALLAM, Primary Examiner

U.S. Cl. X.R.

317—242